United States Patent
Iwase et al.

(10) Patent No.: US 8,185,284 B2
(45) Date of Patent: May 22, 2012

(54) CONTROL DEVICE OF AUTOMATIC TRANSMISSION, AND CONTROL METHOD OF AUTOMATIC TRANSMISSION

(75) Inventors: Masakatsu Iwase, Okazaki (JP); Hiroshi Tsutsui, Nishio (JP); Shingo Kodama, Anjo (JP); Yongsong Kang, Toyohashi (JP); Tatsurou Kameyama, Kota-cho (JP)

(73) Assignee: Aisin AW Co. Ltd., Aichi-ken (JP)

( * ) Notice: Subject to any disclaimer, the term of this patent is extended or adjusted under 35 U.S.C. 154(b) by 823 days.

(21) Appl. No.: 12/176,466

(22) Filed: Jul. 21, 2008

(65) Prior Publication Data
US 2009/0062997 A1    Mar. 5, 2009

(30) Foreign Application Priority Data
Aug. 31, 2007    (JP) .................. 2007-226413

(51) Int. Cl.
*G06F 7/00* (2006.01)
*G06F 17/00* (2006.01)
(52) U.S. Cl. ............. 701/60; 701/51; 701/58; 701/65
(58) Field of Classification Search ............ 701/51, 701/58, 60, 65
See application file for complete search history.

(56) References Cited

U.S. PATENT DOCUMENTS

| | | | | |
|---|---|---|---|---|
| 5,542,887 A * | 8/1996 | Tsukamoto et al. | | 475/63 |
| 6,023,648 A * | 2/2000 | Murasugi et al. | | 701/68 |
| 6,317,671 B1 * | 11/2001 | Tsutsui et al. | | 701/51 |
| 2004/0158382 A1 * | 8/2004 | Furuichi et al. | | 701/51 |
| 2004/0242359 A1 | 12/2004 | Sugawara et al. | | |
| 2005/0027424 A1 * | 2/2005 | Matsubara et al. | | 701/51 |
| 2005/0222734 A1 * | 10/2005 | Akaike | | 701/51 |
| 2005/0283298 A1 | 12/2005 | Ochi et al. | | |
| 2006/0100765 A1 * | 5/2006 | Matsubara et al. | | 701/51 |
| 2006/0184304 A1 * | 8/2006 | Katou et al. | | 701/54 |
| 2008/0020896 A1 * | 1/2008 | Kamishima | | 477/117 |
| 2008/0071449 A1 * | 3/2008 | Kondo et al. | | 701/51 |
| 2010/0121542 A1 * | 5/2010 | Tsukamoto et al. | | 701/51 |

FOREIGN PATENT DOCUMENTS

| | | |
|---|---|---|
| JP | 60-220260 A | 11/1985 |
| JP | 07-293687 A | 11/1995 |
| JP | 2000-205395 A | 7/2000 |
| JP | 2001-165289 A | 6/2001 |
| JP | 2003-156143 A | 5/2003 |
| JP | 2004-353750 A | 12/2004 |
| JP | 2006-001338 A | 1/2006 |

* cited by examiner

*Primary Examiner* — Kaitlin Joerger
*Assistant Examiner* — Prasad Gokhale
(74) *Attorney, Agent, or Firm* — Sughrue Mion, PLLC

(57) ABSTRACT

ECU executes in-neutral control in a case where a first clutch is brought into a half-engagement state on the basis of execution of neutral control. During the in-neutral control, ECU detects engine speed and input-shaft rotating speed, and detects differential rotation before an oil pressure change. Subsequently, in a case where the differential rotation before an oil pressure change detected by ECU has exceeded a first differential rotation threshold value, the operating oil pressure for a hydraulic servo is reduced by the first oil pressure.

12 Claims, 6 Drawing Sheets

|  | C1 | C2 | C3 | B1 | B2 | B3 | B4 | B5 | F1 | F2 |
|---|---|---|---|---|---|---|---|---|---|---|
| N |  |  |  |  |  |  |  | ○ |  |  |
| 1ST | ○ |  |  |  | △ |  |  | ○ |  | ○ |
| 2ND | ○ |  |  | △ | ○ |  |  | ○ | ○ |  |
| 3RD | ○ |  |  | △ | ○ |  | ○ |  | ○ |  |
| 4TH | ○ |  | ○ | △ | ○ |  |  |  | ○ |  |
| 5TH | ○ | ○ | ○ |  |  |  |  |  |  |  |
| REV |  | ○ |  |  |  | ○ |  | ○ |  |  |

○: ENGAGEMENT   △: AT THE TIME OF ENGINE BRAKE

CONTROL DEVICE OF AUTOMATIC TRANSMISSION, AND CONTROL METHOD OF AUTOMATIC TRANSMISSION

BACKGROUND OF THE INVENTION

1. Field of the Invention

The present invention relates to a control device of an automatic transmission, and a control method of an automatic transmission.

2. Description of Related Art

Generally, an automatic transmission that transmits the rotation of an engine is mounted on a vehicle. Such an automatic transmission is provided with a torque converter and a transmission mechanism serving as rotation transmission mechanisms. The transmission mechanism is provided with an input clutch for connecting and disconnecting the rotation transmitted via the torque converter from the engine. This input clutch is brought into an engagement state in a case where the automatic transmission is in a forward travel range (hereinafter referred to as "D range"), and is brought into a released state in a case where the automatic transmission is in a neutral range (hereinafter referred as to "N range").

Therefore, in a case where the automatic transmission is the D range at the time that the vehicle is stopped, the input clutch is in an engagement state. Thus, the load generated by the torque converter becomes large. As a result, the fuel efficiency of the vehicle is worsened. Thus, recently, a control device (hereinafter referred to as "related-art control device") of an automatic transmission as described in, for example, JP-A-2001-165289, Paragraph No.

FIG. 8, is suggested as a device that can improve the fuel efficiency of a vehicle.

In the related-art control device, in a case where it is determined that the vehicle is in a stopped state, the neutral control for putting the input clutch in an engagement state into a half-engagement state is executed. That is, in the related-art control device, in-neutral control is executed after execution of the release control of causing the oil pressure for the input clutch to be reduced to the oil pressure immediately before the input clutch is brought into a half-engagement state. During the in-neutral control, the related-art control device detects the variation of differential rotation between the engine speed of the input side that becomes the engine side of the torque converter, and the rotating speed of the output side that becomes the input clutch side while the oil pressure for an input clutch is minutely changed. Also, in a case where the variation of differential rotation is within a preset predetermined range, the related-art control device determines that the input clutch is actually in a half-engagement state, and the oil pressure for the input clutch is held at a fixed pressure. Therefore, at the time of the stop of the vehicle, the input clutch is maintained in a half-engagement state. Therefore, the load generated by the torque converter is reduced, and as a result, the fuel efficiency of the vehicle is improved.

Meanwhile, whether or not the input clutch has been brought into a half-engagement state on the basis of the execution of in-neutral control is determined on the basis of whether or not the variation per unit time of differential rotation is within a predetermined threshold range. Therefore, when the in-neutral control is started, the magnitude of the differential rotation may differ whenever the neutral control is executed. Accordingly, in a case where the differential rotation is comparatively large during the in-neutral control, there is the possibility that the calorific value generated in the input clutch in a half-engagement state may be increased as compared with a case where the differential rotation is comparatively small, and the durability of the input clutch might degraded.

Further, even if the oil pressure for the input clutch is held at a fixed pressure during the in-neutral control, and the oil pressure is actually in a stable state, the differential rotation may become large gradually. In such a case, the calorific value generated in the input clutch may be gradually increased as the differential rotation becomes large. As a result, there is a possibility that the durability of the input clutch may degrade.

SUMMARY OF THE INVENTION

The invention has been made in view of such circumstances, and an object of the invention is to provide a control device of an automatic transmission and a control method of an automatic transmission, capable of reducing a calorific value generated in an input clutch during neutral control at the time of stop of a vehicle, and controlling degradation in the durability of the input clutch.

In order to achieve the above object, an aspect of the control device of an automatic transmission of the invention is a control device of an automatic transmission including a rotation transmission mechanism for transmitting the rotation of a prime mover mounted on a vehicle to a transmission mechanism, and an input clutch for controlling to connect and disconnect the rotation transmitted from the rotation transmission mechanism. The control device includes a control means that causes the fluid pressure for the input clutch to be reduced, and executes the neutral control of bringing the input clutch in an engagement state into a half-engagement state, in a case where the vehicle is in a stopped state. The control means executes the in-neutral control of maintaining the half-engagement state of the input clutch during the neutral control. The control device further includes a differential rotation detecting means that detects differential rotation between the input-side engine speed and output-side rotating speed of the rotation transmission mechanism. The control means causes the fluid pressure for the input clutch to be reduced in a case where the differential rotation detected by the differential rotation detecting means has exceeded a preset differential rotation threshold value in a state where the control for holding the fluid pressure for the input clutch at a fixed pressure is started in order to maintain the half-engagement state of the input clutch during the in-neutral control.

In an aspect of the control device of an automatic transmission of the invention, preferably, the control means causes the fluid pressure for the input clutch to be reduced in a case where the differential rotation detected by the differential rotation detecting means has exceeded a preset differential rotation threshold value before the control means determines that the fluid pressure for the input clutch has actually been brought into a stable state, in a state where the control for holding the fluid pressure for the input clutch at a fixed pressure is started during the in-neutral control.

In an aspect of the control device of an automatic transmission of the invention, preferably, the differential rotation detecting means detects as initial differential rotation the differential rotation after the control that holds the fluid pressure for the input clutch at a fixed pressure is started during the in-neutral control, and detects as after-stability differential rotation the differential rotation for every preset given period from a point of time when it is determined that the fluid pressure for the input clutch has actually been brought into a stable state on the basis of the execution of the control that holds the fluid pressure for the input clutch at a fixed pressure. The control means causes the fluid pressure for the input clutch to be reduced in a case where the after-stability differential rotation detected by the differential rotation detecting means has exceeded the differential rotation threshold value, and a subtraction result between the initial differential rotation and the after-stability differential rotation has exceeded a variation threshold value that is preset as a value smaller than the differential rotation threshold value, after it is determined that the fluid pressure for the input clutch has actually been brought into a stable state.

In an aspect of the control device of an automatic transmission of the invention, preferably, the differential rotation detecting means detects as initial differential rotation the differential rotation after the control that holds the fluid pressure for the input clutch at a fixed pressure is started during the in-neutral control, and detects as after-stability differential rotation the differential rotation for every preset given period from a point of time when it is determined that the fluid pressure for the input clutch has actually been brought into a stable state on the basis of the execution of the control that holds the fluid pressure for the input clutch at a fixed pressure. The control means causes the fluid pressure for the input clutch to be reduced in a first mode in a case where the differential rotation detected by the differential rotation detecting means has exceeded the differential rotation threshold value before it is determined that the fluid pressure for the input clutch has actually been brought into a stable state, and the control means causes the fluid pressure for the input clutch to be reduced in a second mode in a case where the after-stability differential rotation detected by the differential rotation detecting means has exceeded the differential rotation threshold value, and a subtraction result between the initial differential rotation and the after-stability differential rotation has exceeded a variation threshold value that is preset as a value smaller than the differential rotation threshold value, after it is determined that the fluid pressure for the input clutch has actually been brought into a stable state.

In an aspect of the control device of an automatic transmission of the invention, preferably, the first mode is set so that the amount of pressure reduction of the fluid pressure may increase as compared with a case where the fluid pressure for the input clutch is reduced on the basis of the second mode.

Preferably, an aspect of the control device of an automatic transmission of the invention further includes a temperature detecting means for detecting the temperature of fluid for generating the fluid pressure for the input clutch. The control means causes the fluid pressure for the input clutch to be reduced in a case where the control for holding the fluid pressure for the input clutch at a fixed pressure is being executed and the temperature of the fluid detected by the temperature detecting means is higher than a preset temperature threshold value, during the in-neutral control, and in a case where the differential rotation detected by the differential rotation detecting means has exceeded the differential rotation threshold value.

Meanwhile, an aspect of the control method of an automatic transmission of the invention is a control method of an automatic transmission including a rotation transmission mechanism for transmitting the rotation of a prime mover mounted on a vehicle to a transmission mechanism, and an input clutch for controlling to connect and disconnect the rotation transmitted from the rotation transmission mechanism. The method executes the neutral control of bringing the input clutch in an engagement state into a half-engagement state, when the vehicle is in a stopped state. The method includes: a release operation of executing the release control that causes the fluid pressure for the input clutch to be reduced in order to bring the input clutch in an engagement state into a half-engagement state when the vehicle is in a stopped state; an in-neutral operation of confirming whether or not the input clutch is in a half-engagement state after the execution of the release operation, and of executing the in-neutral control of causing the fluid pressure for the input clutch to be held at a fixed pressure in a case where it is confirmed that the input clutch is in a half-engagement state; and a fluid-pressure reducing operation of detecting differential rotation between the input-side rotating speed and the output-side rotating speed of the rotation transmission mechanism during execution of the control that holds the fluid pressure for the input clutch at a fixed pressure during the in-neutral control, and of causing the fluid pressure for the input clutch to be reduced in a case where the detected result has exceeded a preset differential rotation threshold value.

In an aspect of the control method of an automatic transmission of the invention, preferably, the fluid-pressure reducing operation includes a differential rotation fluid-pressure reducing operation of causing the fluid pressure for the input clutch to be reduced in a case where differential rotation before it is determined that the fluid pressure for the input clutch has actually been brought into a stable state has exceeded the differential rotation threshold value, in a state where the control for holding the fluid pressure for the input clutch at a fixed pressure is started during the in-neutral control.

In an aspect of the control method of an automatic transmission of the invention, preferably, the fluid-pressure reducing operation includes an initial differential rotation setting operation of, in a case where differential rotation before it is determined that the fluid pressure for the input clutch has actually been brought into a stable state is the differential rotation threshold value or less after the control that holds the fluid pressure for the input clutch at a fixed pressure is started during the in-neutral control, setting the differential rotation to initial differential rotation, and of setting differential rotation detected after the execution of the differential rotation fluid-pressure reducing operation to initial differential rotation, in a case where the differential rotation before it is determined that the fluid pressure for the input clutch has actually been brought into a stable state has exceeded the differential rotation threshold value; an after-stability differential rotation setting operation of setting to after-stability differential rotation the differential rotation detected for every preset given period from a point of time when it is determined that the fluid pressure for the input clutch has actually been brought into a stable state after the execution of the initial differential rotation setting operation; and a variation fluid-pressure reducing operation of causing the fluid pressure for the input clutch to be reduced in a case where the after-stability differential rotation set in the after-stability differential rotation setting operation has exceeded the differential rotation threshold value, and a subtraction result between the initial differential rotation and the after-stability differential rotation has exceeded a variation threshold value that is preset as a value smaller than the differential rotation threshold value.

In an aspect of the control method of an automatic transmission of the invention, preferably, the fluid-pressure reducing operation includes an initial differential rotation setting operation of, in a case where differential rotation before it is determined that the fluid pressure for the input clutch has actually been brought into a stable state is the differential rotation threshold value or less after the control that holds the fluid pressure for the input clutch at a fixed pressure is started during the in-neutral control, setting the differential rotation to initial differential rotation, and of, even in a case where the differential rotation before it is determined that the fluid pressure for the input clutch has actually been brought into a stable state has exceeded the differential rotation threshold value, setting the differential rotation to initial differential rotation; an after-stability differential rotation setting operation of setting to after-stability differential rotation the differential rotation detected for every preset given period from a point of time when it is determined that the fluid pressure for the input clutch has actually been brought into a stable state after the execution of the initial differential rotation setting operation; and a variation fluid-pressure reducing operation of causing the fluid pressure for the input clutch to be reduced in a case where the after-stability differential rotation set in the after-stability differential rotation setting operation has exceeded the differential rotation threshold value, and a subtraction result between the initial differential rotation and the after-stability differential rotation has exceeded a variation threshold value that is preset as a value smaller than the differential rotation threshold value.

In an aspect of the control method of an automatic transmission of the invention, the fluid-pressure reducing operation includes an initial differential rotation setting operation of setting to initial differential rotation the differential rotation detected in a state where the control that holds the fluid pressure for the input clutch at a fixed pressure is started during the in-neutral control; an after-stability differential rotation setting operation of setting to after-stability differential rotation the differential rotation detected for every preset given period from a point of time when it is determined that the fluid pressure for the input clutch has actually been brought into a stable state on the basis of the execution of the control that holds the fluid pressure for the input clutch at a fixed pressure; and a variation fluid-pressure reducing operation of causing the fluid pressure for the input clutch to be reduced in a case where the after-stability differential rotation set in the after-stability differential rotation setting operation has exceeded the differential rotation threshold value, and a subtraction result between the initial differential rotation and the after-stability differential rotation has exceeded a variation threshold value that is preset as a value smaller than the differential rotation threshold value.

DESCRIPTION OF EXEMPLARY EMBODIMENTS

One exemplary embodiment in which the invention is embodied in a control device of an automatic transmission mounted on a vehicle, and a control method of an automatic transmission will be explained according to FIGS. 1 to 9.

Figures 1, 2:
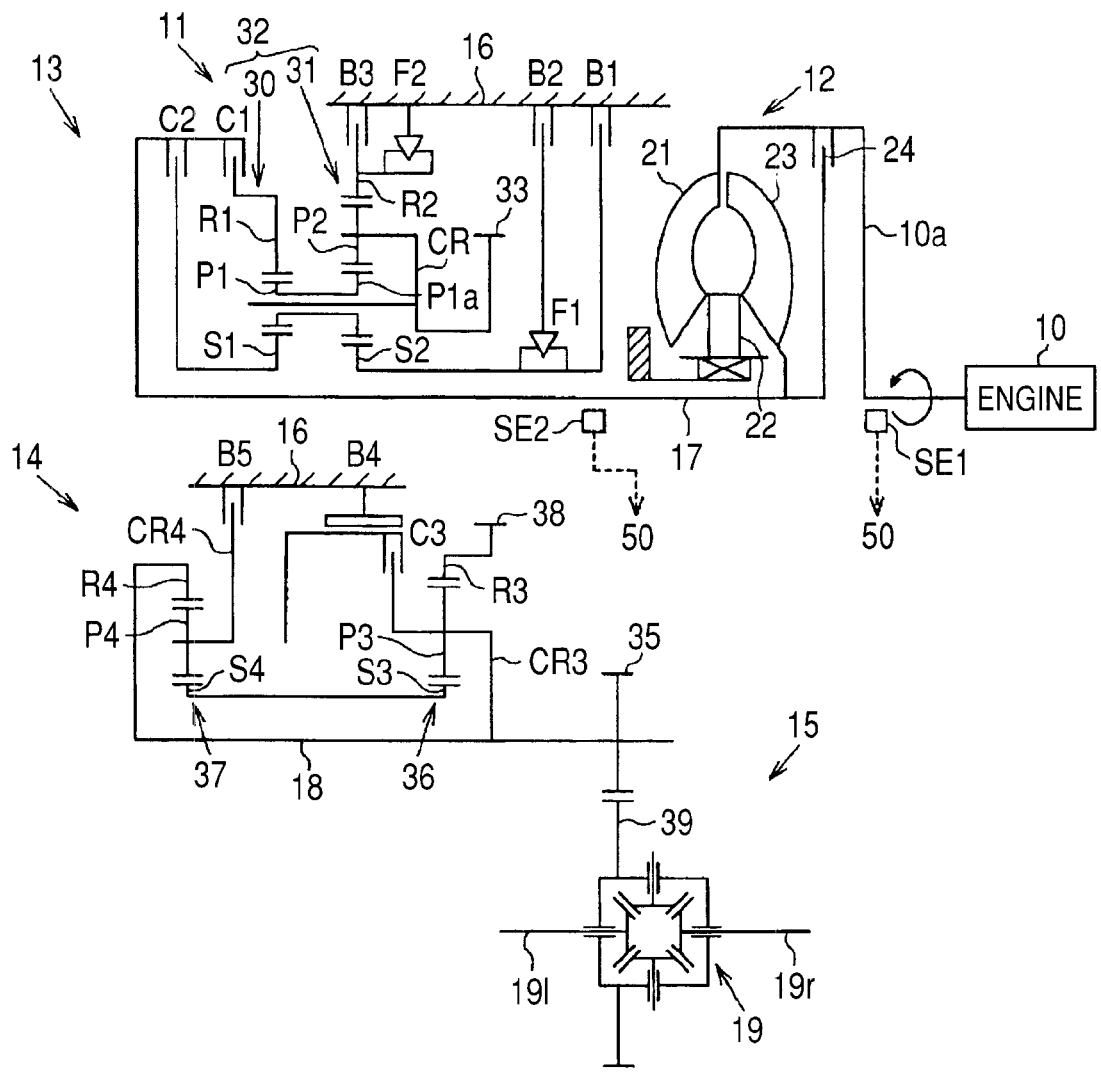
FIG. 1 is a skeleton view showing an automatic transmission of an exemplary embodiment.
FIG. 2 is an operation table of respective clutches and respective brakes at respective shift stages.

As shown in FIG. 1, an automatic transmission 11 of this embodiment is an automatic transmission with five forward stages, and one reverse stage. This automatic transmission 11 includes a torque converter 12, a three-speed main transmission mechanism 13, a three-speed auxiliary transmission mechanism 14, and a differential mechanism 15, as rotation transmission mechanisms that are arranged in order from the engine (prime mover) 10 side that becomes the upstream side in the direction of power transmission towards the driving wheel side that becomes the downstream side. These respective mechanisms 12, 13, 14, and 15 are housed within a transmission case 16, respectively. A first shaft (hereinafter referred to as an "input shaft") 17 that is arranged in alignment with a crankshaft 10a extending from the engine 10 side, and a second shaft (hereinafter referred to as a "counter shaft") 18 and a third shaft 19 (axles of right and left front wheels, which are referred to as "left and right front axles 19l and 19r"), which are parallel to the input shaft 17, are supported rotatably within the transmission case 16. Further, a valve body that is not shown is provided outside the transmission case 16.

Within the torque converter 12, a pump impeller 21, a stator 22, and a turbine 23 that are connected to a crankshaft 10a are provided. In a case where the pump impeller 21 rotates on the basis of the rotation of the engine 10 (crankshaft 10a), the rotation is transmitted to the turbine 23 via operating oil serving as a fluid within the torque converter 12, whereby the rotation of the engine 10 is transmitted to the three-speed main transmission mechanism 13. Further, a lock-up clutch 24 is provided within the torque converter 12. In a case where the lock-up clutch 24 is engaged, the pump impeller 21 and the turbine 23 are mechanically connected via the lock-up clutch 24. Therefore, in this case, the rotation of the engine 10 is transmitted to the three-speed main transmission mechanism 13 without via the operating oil.

The three-speed main transmission mechanism 13 includes a planetary gear unit 32 having a simple planetary gear 30 and a double pinion planetary gear 31. The simple planetary gear 30 is provided with a sun gear S1, a ring gear R1, and a common carrier CR that supports a pinion P1 meshing with these gears S1 and R1, respectively. On the other hand, the double pinion planetary gear 31 is provided with a sun gear S2, a ring gear R2, and the common carrier CR that is also a component of the simple planetary gear 30. The common carrier CR supports a pinion P1a that meshes with the sun gear S2, and a pinion P2 that meshes with the ring gear R2, in a state where the pinions P1a and P2 mesh with each other.

With respect to the planetary gear unit 32, the input shaft 17 to which the rotation of the engine 10 is transmitted via the torque converter 12 can be connected to the ring gear R1 of the simple planetary gear 30 via a first clutch C1 serving as an input clutch, and can be connected to the sun gear S1 via a second clutch C2. Further, the sun gear S2 of the double pinion planetary gear 31 can be locked directly by the first brake B1, and can be locked by a second brake B2 via a first one-way clutch F1. Further, the ring gear R2 of the double pinion planetary gear 31 can be locked by a third brake B3 and a second one-way clutch F2. The common carrier CR is connected to a counter drive gear 33 that is an output member of the three-speed main transmission mechanism 13.

The three-speed auxiliary transmission mechanism 14 includes a first simple planetary gear 36, a second simple planetary gear 37, and an output gear 35. The respective gears 35, 36, and 37 are arranged in order from one side (right in FIG. 1) in the axial direction of the counter shaft 18 towards the other side (left in FIG. 1). The first simple planetary gear 36 is provided with a ring gear R3, a sun gear S3, and a pinion P3, and a counter driven gear 38 that meshes with the counter drive gear 33 of the three-speed main transmission mechanism 13 is connected to the ring gear R3. Further, the sun gear S3 is rotatably supported by the counter shaft 18, the pinion P3 is supported by a carrier CR3 composed of a flange integrally connected to the counter shaft 18. The carrier CR3 is connected to an inner hub of a UD direct clutch C3.

The second simple planetary gear 37 is provided with a sun gear S4, a ring gear R4, and a pinion P4. The sun gear S4 is connected to the sun gear S3 of the first simple planetary gear 36, and the ring gear R4 is connected to the counter shaft 18. The UD direct clutch C3 is disposed between the carrier CR3 of the first simple planetary gear 36 and each of the sun gears S3 and S4, and each of the sun gears S3 and S4 can be locked by a fourth brake B4 composed of a band brake. Moreover, the pinion P4 is supported by the carrier CR4, and the carrier CR4 can be locked by a fifth brake B5.

In addition, the above-described respective brakes B1 to B5, and the second one-way clutch F2 are attached to the internal surface of the transmission case 16.

The differential mechanism 15 includes a ring gear 39 that meshes with the output gear 35 of the three-speed auxiliary transmission mechanism 14. The rotation transmitted via the ring gear 39 from the output gear 35 side is branched right and left, and is transmitted to the left and right front axles 19l and 19r, respectively.

Next, the operation of the automatic transmission 11 will be explained with reference to FIGS. 1 and 2.

In a case where the shift stage is a first speed (1ST) in a forward travel range (hereinafter referred to as "D range"), the first clutch C1, the fifth brake B5, and the second one-way clutch F2 are brought into a state of engagement, respectively. Then, the ring gear R2 of the double pinion planetary gear 31 and the carrier CR4 of the second simple planetary gear 37 are brought into a stopped state, respectively. In this case, the rotation of the input shaft 17 is transmitted to the ring gear R1 of the simple planetary gear 30 via the first clutch C1. Also, since the ring gear R2 is in a stopped state, the forward rotation of the ring gear R1 of the simple planetary gear 30 is significantly reduced by the double pinion planetary gear 31, and is transmitted to the common carrier CR. As described, in a case where the forward rotation (hereinafter referred to as "deceleration rotation") that is decelerated significantly is transmitted to the common carrier CR, it is said that the three-speed main transmission mechanism 13 is in a first speed state. This deceleration rotation is transmitted to the ring gear R3 of the first simple planetary gear 36 via the counter drive gear 33 and the counter driven gear 38. Then, since the carrier CR4 of the second simple planetary gear 37 is brought into in a stopped state by the fifth brake B5, the deceleration rotation of the ring gear R3 is further decelerated by the three-speed auxiliary transmission mechanism 14. As such, in a case where the rotation transmitted from the three-speed main transmission mechanism 13 is further decelerated due to the fifth brake B5 being in an engagement state, it is said that the three-speed auxiliary transmission mechanism 14 is in the first speed state. The deceleration rotation that is further decelerated by the three-speed auxiliary transmission mechanism 14 is transmitted toward the differential mechanism 15 (that is, driving wheel) via the output gear 35. That is, the first speed as the whole automatic transmission 11 is obtained by combining the first speed state of the three-speed main transmission mechanism 13 with the first speed state of the three-speed auxiliary transmission mechanism 14. In addition, the third brake B3 operates at the time of engine brake at the first speed.

In a case where the shift from the first speed to a second speed (2ND) is made in the D range, the engagement states of the first clutch C1 and the fifth brake B5 are maintained, respectively, and the second brake B2 and the first one-way clutch F1 are brought into an engagement state, respectively. On the other hand, the second one-way clutch F2 is brought into a non-engagement state. Then, the sun gear S2 of the double pinion planetary gear 31 is brought into a stopped state by the second brake B2 and the first one-way clutch F1. Therefore, the rotation of the ring gear R1 transmitted via the first clutch C1 from the input shaft 17 is decelerated by the simple planetary gear 30, and is transmitted to the common carrier CR as forward deceleration rotation. As such, in the case where the rotation of ring gear R1 is decelerated by the simple planetary gear 30, it is said that the three-speed main transmission mechanism 13 is in a second speed state. Further, the three-speed auxiliary transmission mechanism 14 is in the first speed state. Also, the second speed as the whole automatic transmission 11 is obtained by combining the second speed state of the three-speed main transmission mechanism 13 with the first speed state of the three-speed auxiliary transmission mechanism 14. In addition, the first brake B1 is engaged at the time of engine brake at the second speed.

In a case where the shift from the second speed to a third speed (3RD) is made in the D range, the engagement states of the first clutch C1, the second brake B2, and the first one-way switch F1 are maintained, respectively, and the fourth brake B4 is brought into an engagement state. On the other hand, the fifth brake B5 is brought into a non-engagement state. That is, the state of the three-speed main transmission mechanism 13 is the second speed state. The deceleration rotation that is decelerated by the three-speed main transmission mechanism 13 is transmitted to the ring gear R3 of the first simple planetary gear 36 via the counter drive gear 33 and the counter driven gear 38. Then, since the ring gear R3 of the first simple planetary gear 36 is in a stopped state by the fourth brake B4, this deceleration rotation is transmitted toward the differential mechanism 15 via the output gear 35, in a further decelerated state. As such, in the case where the rotation transmitted from the three-speed main transmission mechanism 13 is further decelerated due to the fourth brake B4 being in an engagement state, it is said that the three-speed auxiliary transmission mechanism 14 is in the second speed state. That is, the third speed as the whole automatic transmission 11 is obtained by combining the second speed state of the three-speed main transmission mechanism 13 with the second speed state of the three-speed auxiliary transmission mechanism 14. In addition, the first brake B1 is engaged at the time of engine brake at the third speed.

In a case where the shift from the third speed to a fourth speed (4TH) is made in the D range, the engagement states of the first clutch C1, the second brake B2, and the first one-way clutch F1 are maintained, respectively, and the UD direct clutch C3 is brought into an engagement state. On the other hand, the fourth brake B4 is brought into a non-engagement state. That is, the three-speed main transmission mechanism 13 is in the second speed state. Further, the three-speed auxiliary transmission mechanism 14 is brought into a directly connected state where the ring gear R3 and each of the sun gears S3 and S4 are connected, and the simple planetary gears 36 and 37 rotate integrally. Such a state of the three-speed auxiliary transmission mechanism 14 is called third speed state. Therefore, the fourth speed as the whole automatic transmission 11 is obtained by combining the second speed state of the three-speed main transmission mechanism 13 with the third speed state of the three-speed auxiliary transmission mechanism 14. In addition, the first brake B1 is engaged at the time of engine brake at the fourth speed.

In a case where the shift from the fourth speed to a fifth speed (5TH) is made in the D range, the engagement states of the first clutch C1 and the UD direct clutch C3 are maintained, respectively, and the second clutch C2 is brought into an engagement state. On the other hand, the second brake B2 and the first one-way clutch F1 are brought into a non-engagement state. Then, the three-speed main transmission mechanism 13 is brought into a directly connected state where the rotation of the input shaft 17 is transmitted to the ring gear R1 and the sun gear S1 of the simple planetary gear 30, and the simple planetary gear 30 and the double pinion planetary gear 31 rotate integrally. Such a state of the three-speed main transmission mechanism 13 is called third speed state. Further, the three-speed auxiliary transmission mechanism 14 is in the third speed state. Therefore, the fifth speed as the whole automatic transmission 11 is obtained by combining the third speed state of the three-speed main transmission mechanism 13 with the third speed state of the three-speed auxiliary transmission mechanism 14.

In addition, in a case where the range of the automatic transmission is a reverse travel range (hereinafter referred to as "R range"), switching is made depending on whether or not the vehicle body speed (hereinafter referred to as "vehicle speed") of the vehicle is more than "7 km/h" (7 kilometers per hour). That is, in a case where the vehicle travels forward at "7 km/h" or more, the three-speed main transmission mechanism 13 is brought into a free rotation state, similarly to the neutral range (hereinafter referred to as "N range"). On the other hand, in a case where the vehicle is in a substantially stopped state where the vehicle speed is less than "7 km/h", the second clutch C2, the third brake B3, and fifth brake B5 are brought into an engagement state, respectively. Then, the rotation of the engine 10 is transmitted to the sun gear S1 via the second clutch C2. The rotation of the sun gear S1 is significantly reduced by the double pinion planetary gear 31 since the ring gear R2 is in a stopped state, and the rotation in a reverse direction (hereinafter referred to as "reverse rotation") that is significantly reduced in this way is transmitted to the carrier CR. Then, the reverse rotation of the carrier CR is transmitted to the three-speed auxiliary transmission mechanism 14 in the first speed state (that is, decelerated). Therefore, the decelerated reverse rotation is output from the output gear 35.

Next, a hydraulic control circuit of the automatic transmission 11 will be explained with reference to FIGS. 1 and 3. In addition, only a portion related to the engagement and disengagement of the first clutch C1 is shown in FIG. 3.

Figure 3:
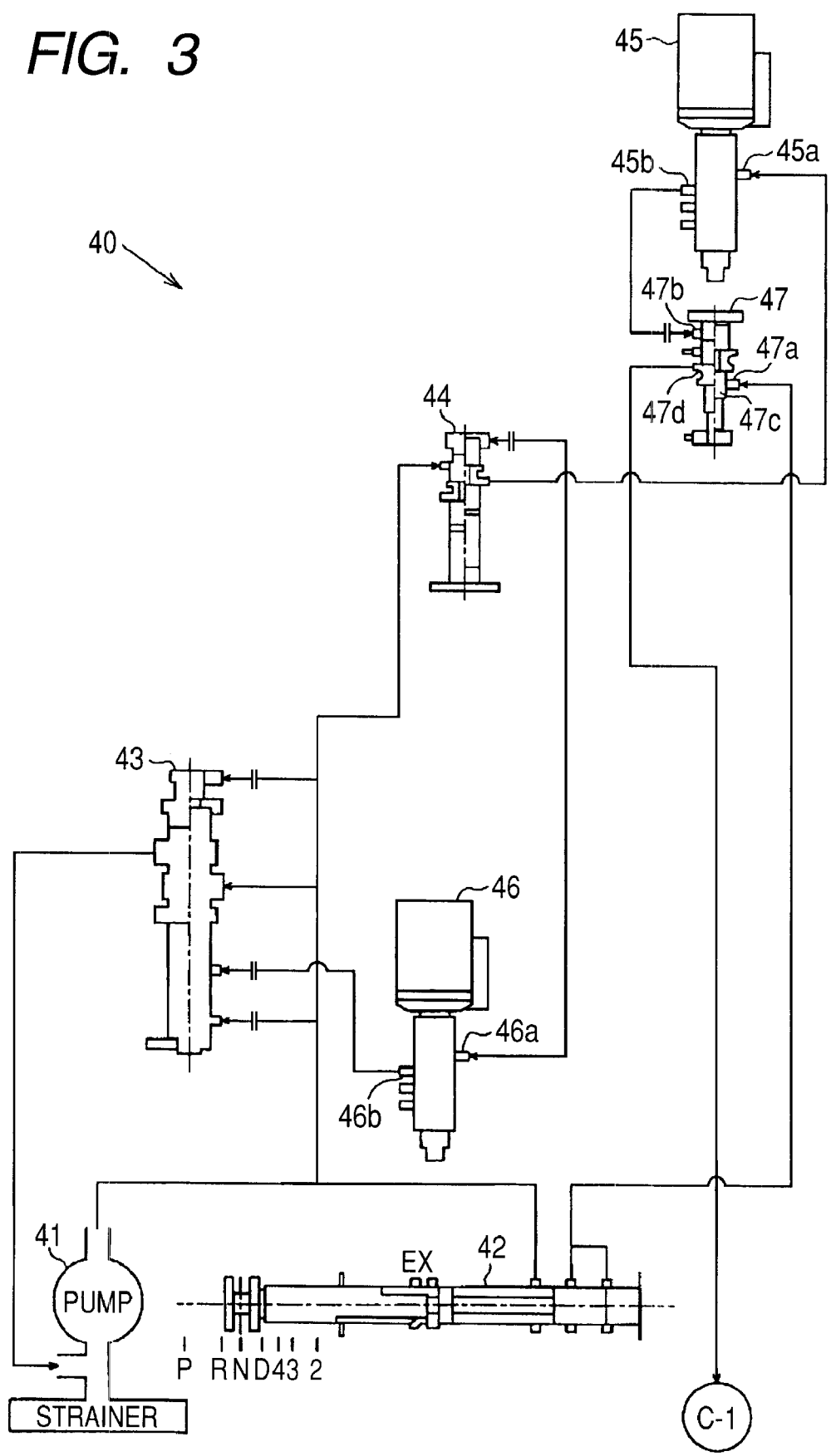
FIG. 3 is a schematic view showing a hydraulic control circuit of a portion related to engagement/disengagement control of a first clutch.

As shown in FIG. 3, the hydraulic control circuit 40 serving as a pressure-regulating mechanism includes an oil pump 41, and a manual valve 42, a primary regulator valve 43, and a modulator valve 44 are connected to the oil pump 41. Linear solenoid valves 45 and 46 are connected to the modulator valve 44, and a control valve 47 is connected to the linear solenoid valve 45. A hydraulic servo C-1 for controlling the engagement and disengagement of the first clutch C1 is connected to the control valve 47.

The operating oil pressure generated on the basis of the driving of the oil pump 41 is regulated to line pressure by the primary regulator valve 43, and then is supplied to the manual valve 42 and the modulator valve 44, respectively. Then, in the modulator valve 44, the line pressure is reduced, and the reduced line pressure is supplied to input ports 45a and 46a of the linear solenoid valves 45 and 46. In each of the linear solenoid valves 45 and 46 to which the line pressure has been supplied in this way, the control oil pressure corresponding to the energization mode of the valve is generated. The control oil pressure generated by the linear solenoid valve 45 is output to the control valve 47 via an output port 45b, and the control oil pressure generated by the linear solenoid valve 46 is output to the primary regulator valve 43 via an output port 46b.

Further, the line pressure is supplied to the control valve 47 via an input port 47a from the manual valve 42, and the line pressure is regulated by a spool 47c that reciprocates on the basis of the control oil pressure from the linear solenoid valve 45 input to the port 47b, and is supplied to the hydraulic servo C-1 from a port 47d. That is, control for the engagement and disengagement of the clutch C1 is performed as the operating oil pressure supplied to the hydraulic servo C-1 is regulated in response to the energization of the linear solenoid valve 45.

Next, an electronic control unit (hereinafter referred to as "ECU") as a control device that controls the driving of the automatic transmission 11 will be explained with reference to FIG. 4.

Figure 4:
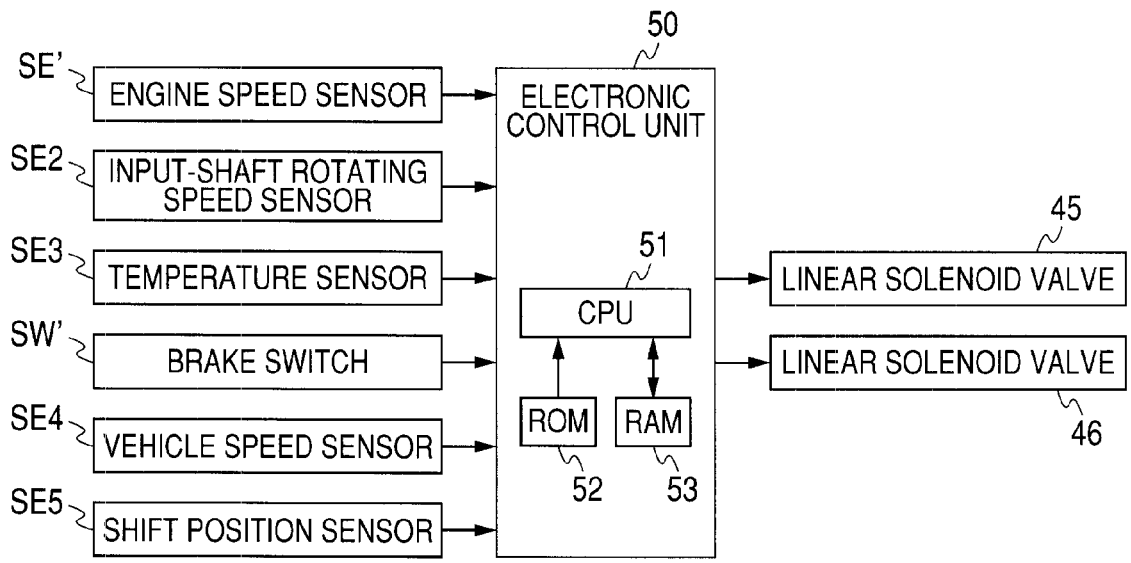
FIG. 4 is a block diagram showing an electric configuration.

As shown in FIG. 4, the ECU 50 is mainly composed of an input-side interface (not shown), an output-side interface (not shown), a digital computer provided with CPU 51, ROM 52, RAM 53, etc., and a driving circuit that allows each mechanism to be driven. An engine speed sensor SE1 for detecting the rotating speed of the engine 10 (crankshaft 10a), an input-shaft rotating speed sensor SE2 for detecting the rotating speed of the input shaft 17, and an oil temperature sensor SE3 for detecting the oil temperature of the operating oil within the hydraulic servo C-1 is electrically connected to the input-side interface of ECU 50. Further, in a case where a brake pedal that is not shown is stepped down, a brake switch SW1 that outputs an "ON" signal, a speed sensor SE4 for detecting a vehicle speed, and a shift position sensor SE5 for detecting the shift range of the automatic transmission 11 are electrically connected to the input-side interface.

On the other hand, each of the linear solenoid valves 45 and 46 is electrically connected to the output-side interface of ECU 50. ECU 50 individually controls the driving of each of the linear solenoid valves 45 and 46 on the basis of various input signals from the various sensors SE1 to SE5 and the brake switch SW1.

In the digital computer, various kinds of control programs (neutral control processing as will be described later), various threshold values for controlling each of the linear solenoid valves 45 and 46 individually (a first differential rotation threshold value, an oil temperature threshold value, a second differential rotation threshold value, a third differential rotation threshold value, stability confirmation time, setting time, etc. as will be described later), and the like are stored in ROM 52. Further, various kinds of information (engine speed, input-shaft rotating speed, differential rotation, differential rotation before an oil pressure change, oil temperature, differential rotation after an oil pressure change, after-stability differential rotation, a first timer, a second timer, etc., which will be described later) that are suitably rewritten during "ON" of an ignition switch (not shown) of the vehicle are stored in RAM 53.

Figure 5:
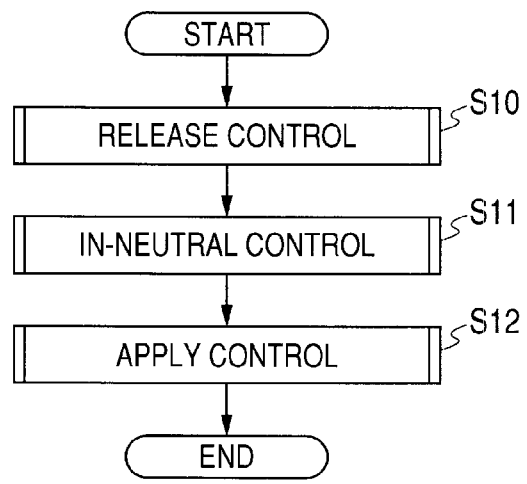
FIG. 5 is a flow chart illustrating a neutral control processing routine.
Figure 6:
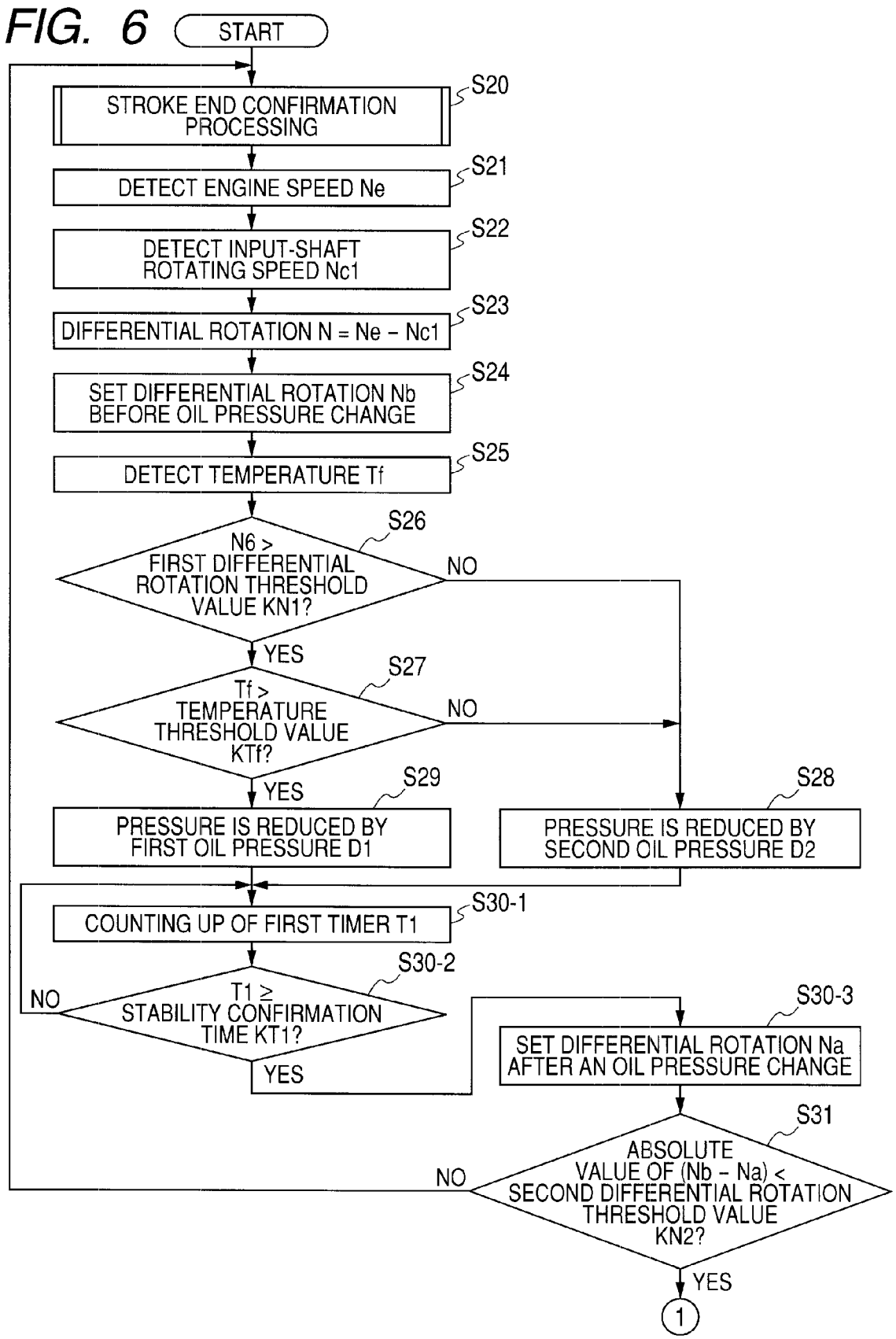
FIG. 6 is a flow chart illustrating a first half of an in-neutral control processing routine.
Figure 7:
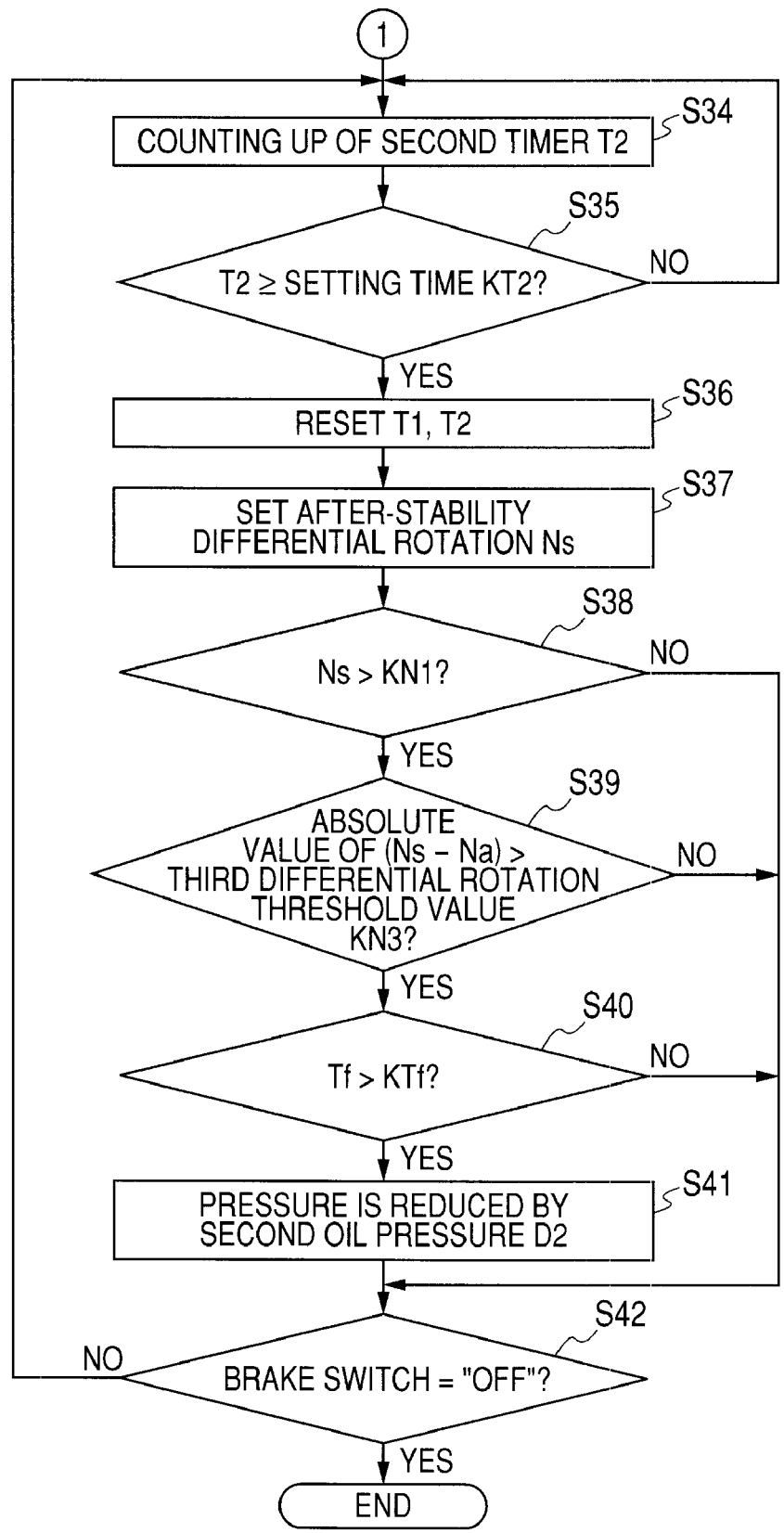
FIG. 7 is a flow chart illustrating a second half of the in-neutral control processing routine.

Next, a neutral control processing routine for executing neutral control while a vehicle is stopped, among respective control processing routines that ECU 50 of this embodiment executes, will be explained below on the basis of flow charts shown in FIGS. 5, 6, and 7, and timing charts shown in FIGS. 8, and 9. In addition, the neutral control is control for bringing the first clutch C1 for controlling to connect or disconnect the rotation transmitted from the torque converter 12 into a half-engagement state, in a case where the range of the automatic transmission 11 is the D range, and the vehicle is in a stopped state.

Now, in a case where the range of the automatic transmission 11 is the D range on the basis of an input signal from the shift position sensor SE5, and the brake switch SW1 is in an "ON" state, ECU 50 executes the neutral control processing routine when the vehicle speed is approximately "0 (zero) km/h" on the basis of an input signal from the speed sensor SE4. In this neutral control processing routine, ECU 50 executes release control (Operation S10). In this regard, ECU 50 functions as a control means in this embodiment. Further, Operation S10 corresponds to the release operation.

Specifically, ECU 50 controls the driving of the hydraulic control circuit 40 (each of the linear solenoid valves 45 and 46), thereby making the operating oil pressure (that is, oil pressure for the first clutch C1) supplied to the hydraulic servo C-1 reduced. Then, as shown in the timing charts shown in FIG. 8 and 9, the engagement force of the first clutch C1 becomes weak gradually in response to the reduction of the operating oil pressure Pc1 supplied to the hydraulic servo C-1, whereby the load applied to the input shaft 17 is gradually reduced. That is, the rotating speed (hereinafter referred to as "input-shaft rotating speed") Nc1 of the input shaft 17 detected by ECU 50 on the basis of the input signal from input-shaft rotating speed sensor SE2 rises gradually. In addition, since an accelerator that is not shown is not stepped down during the neutral control, the rotating speed (hereinafter referred to as "engine speed") Ne of the engine 10 detected by ECU 50 on the basis of an input signal from the engine speed sensor SE1 becomes a fixed rotating speed.

When the release control is continued as described above, the ratio (hereinafter referred to as "speed ratio") e (=Nc1/Ne) of the engine speed Ne and input-shaft rotating speed Nc1 becomes large gradually. When the operating oil pressure Pc1 is gradually reduced, as shown in the first timing t1 of FIG. 8, the load applied the input shaft 17 drops rapidly, whereby the variation per unit time of the speed ratio e increases at a stretch. In a case where the variation per unit time of the speed ratio e is a predetermined threshold value or more that is set in advance, ECU 50 determines that the first clutch C1 has been brought into a state immediately before half-engagement, and completes the release control. In addition, the half-engagement state of the first clutch C1 is a state where the first clutch C1 can be rapidly brought into an engagement state by putting the first clutch C1 into a sliding state to reduce the frictional force generated in the first clutch C1, and by boosting the operating oil pressure Pc1 only slightly.

Then, ECU 50 executes the in-neutral control (as will be explained in detail in FIGS. 6 and 7.) for maintaining the half-engagement state of the first clutch C1 (Operation S11). In this regard, in this embodiment, Operation S11 corresponds to the in-neutral operation.

Subsequently, ECU 50 executes apply control for putting the first clutch C1 in the half-engagement state into an engagement state, in a case where the in-neutral control is completed (Operation S12). Specifically, ECU 50 controls the driving of the hydraulic control circuit 40, thereby boosting the operating oil pressure Pc1 for the hydraulic servo C-1, and holding the operating oil pressure Pc1 when it is determined that the first clutch C1 has been brought into an engagement state. Thereafter, ECU 50 ends the neutral control processing routine.

Next, the in-neutral control processing routine for executing the above-mentioned in-neutral control (Operation S11) will be explained below with reference to the timing charts shown in FIGS. 6 and 7, and the flow charts shown in FIGS. 8 and 9.

Now, in the in-neutral control processing routine, ECU 50 executes stroke end confirmation processing for confirming whether or not the first clutch C1 is actually in a half-engagement state during predetermined time (for example, "10 seconds") (Operation S20). Specifically, as shown in the timing chart of FIG. 8, ECU 50 controls the driving of the hydraulic control circuit 40 so that the operating oil pressure Pc1 for the hydraulic servo C-1 may be boosted by second oil pressure D2 (for example, "5 kPa (kilopascals)") and the operating oil pressure Pc1 may be reduced by the second oil pressure D2. Then, with a slight delay from such a change of the operating oil pressure Pc1, the differential rotation N between the engine speed Ne and the input-shaft rotating speed Nc1 becomes small slightly, and then changes so as to become large to original differential rotation. After ECU 50 intermittently executes the above change of the operating oil pressure Pc1 four times, and boosts the operating oil pressure Pc1 by the second oil pressure D2 at a fifth time, it completes the stroke end confirmation processing, and controls the driving of the hydraulic control circuit 40 so as to hold the operating oil pressure Pc1 for the hydraulic servo C-1 at a fixed pressure.

In addition, as described above, the stroke end confirmation processing is the processing of determining whether or not the first clutch C1 is actually brought into a half-engagement state by the start of the in-neutral control on the basis of the variation of the differential rotation N when the operating oil pressure Pc1 (refer to FIG. 8) is changed. Thus, in order to continue confirming that the first clutch C1 is in a half-engagement state, a method of continuing executing the stroke end confirmation processing during the in-neutral control can be considered. However, if such a configuration is adopted, the operating oil pressure Pc1 continues being intermittently changed during the in-neutral control. Then, the change of the operating oil pressure Pc1 may be transferred to a vehicle, which is not so preferable in suppressing the vibration of the vehicle. Therefore, in this embodiment, the stroke end confirmation processing is executed during such time (above-mentioned predetermined time) that whether or the first clutch C1 is actually in a half-engagement state after the release control can be confirmed.

Subsequently, ECU 50 detects the engine speed Ne as the input-side engine speed of the torque converter 12 on the basis of an input signal from the engine speed sensor SE1 (Operation S21), and detects the input-shaft rotating speed Nc1 as the output-side rotating speed of the torque converter 12 on the basis of an input signal from the input-shaft rotating speed sensor SE2 (Operation S22). Then, ECU 50 subtracts the input-shaft rotating speed Nc1 detected in Operation S22 from the engine speed Ne detected in Operation S21, and detects the subtraction result as the differential rotation N (Operation S23). Accordingly, in this embodiment, ECU 50 functions as a differential rotation detecting means. In addition, as shown in the timing chart of FIG. 8, Operation S21 and Operation S22 are executed before the input-shaft rotating speed Nc1 is changed due to a change in the operating oil pressure Pc1 for the hydraulic servo C-1.

Subsequently, ECU 50 sets the differential rotation N detected in Operation S23 to differential rotation Nb before an oil pressure change (Operation S24). This differential rotation Nb before an oil pressure change is differential rotation immediately before the operating oil pressure Pc1 is reduced in Operation S28 or Operation S29 as will be described later, and is differential rotation before the operating oil pressure Pc1 is actually brought into a stable state. Then, ECU 50 detects the oil temperature Tf of the operating oil in the hydraulic servo C-1 on the basis of an input signal from the oil temperature sensor SE3 (Operation S25). Accordingly, in this embodiment, ECU 50 functions as a temperature detecting means. Subsequently, ECU 50 determines whether or not the differential rotation Nb before an oil pressure change set in Operation S24 has exceeded a preset first differential rotation threshold value KN1 ("70 rpm" in this embodiment) (Operation S26). The first differential rotation threshold value KN1 is a reference value for determining whether or not the frictional force (that is, calorific value) generated by the first clutch C1 in a half-engagement state is large, and is preset by experiments, simulation, etc. In addition, in a case where the differential rotation Nb before an oil pressure change is the first differential rotation threshold value KN1 or more, since the calorific value in the first clutch C1 is large, execution of the neutral control may not sufficiently contribute to the suppression of degradation in the durability of the first clutch C1.

In a case where the determination result of Operation S26 is a negative determination (Nb≦KN1), the processing of ECU 50 proceeds to Operation S28 as will be described later. On the other hand, in a case where the determination result of Operation S26 is a positive determination (Nb>KN1), ECU 50 determines whether or not the oil temperature Tf detected in Operation S25 is higher than the oil temperature threshold value KTf ("80°" in this embodiment) as a preset temperature threshold value (Operation S27). In addition, in a case where the oil temperature Tf of the operating oil is in a fixed temperature region by the control processing executed in Operation S29 as will be described later, a desired effect can be obtained. On the other hand, in a case where the oil temperature of the operating oil is out of the fixed temperature range, there is a possibility that a desired effect cannot be obtained due to a change in the characteristics of the operating oil based on the difference of the oil temperature Tf. In a case where the determination result of Operation S27 is a negative determination (Tf≦KTf), the processing of ECU 50 proceeds to Operation S28 as will be described later. On the other hand, in a case where the determination result of Operation S27 is a positive determination (Tf>KTf), the processing of ECU 50 proceeds to Operation S29 as will be described later.

Figure 9:
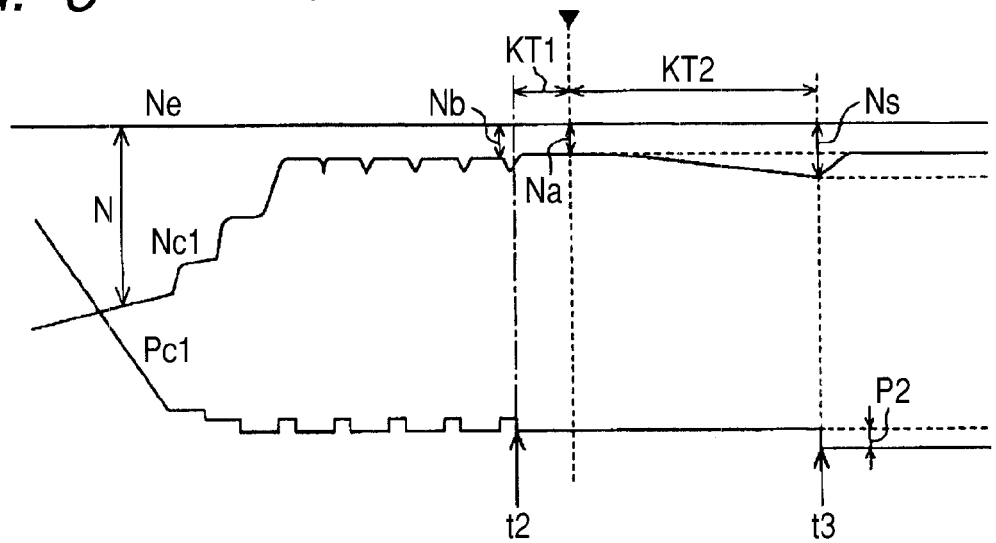
FIG. 9 is a timing chart showing the timing with which operating oil pressure changes during the in-neutral control.

In Operation S28, ECU 50 controls the driving of the hydraulic control circuit 40 so that the operating oil pressure Pc1 for the hydraulic servo C-1 may be reduced by the second oil pressure D2 (refer to FIG. 9). That is, the operating oil pressure Pc1 is reduced in a second mode. Thereafter, the processing of ECU 50 proceeds to Operation S30-1 as will be described later.

In Operation S29, ECU 50 controls the driving of the hydraulic control circuit 40 so that the operating oil pressure Pc1 for the hydraulic servo C-1 may be reduced by the first oil pressure D1 (for example, "8 kPa") larger than the second oil pressure D2. That is, in Operation S29, the operating oil pressure Pc1 is reduced in a first mode different from the second mode. Accordingly, in this embodiment, Operation S29 corresponds to a differential rotation fluid-pressure reducing operation included in a fluid-pressure reducing operation. In addition, the first oil pressure D1 is preset to such a value that the half-engagement state of the first clutch C1 is maintained even if the operating oil pressure Pc1 is reduced in a state where the determination result of Operation S26 becomes a positive determination.

Figure 8:
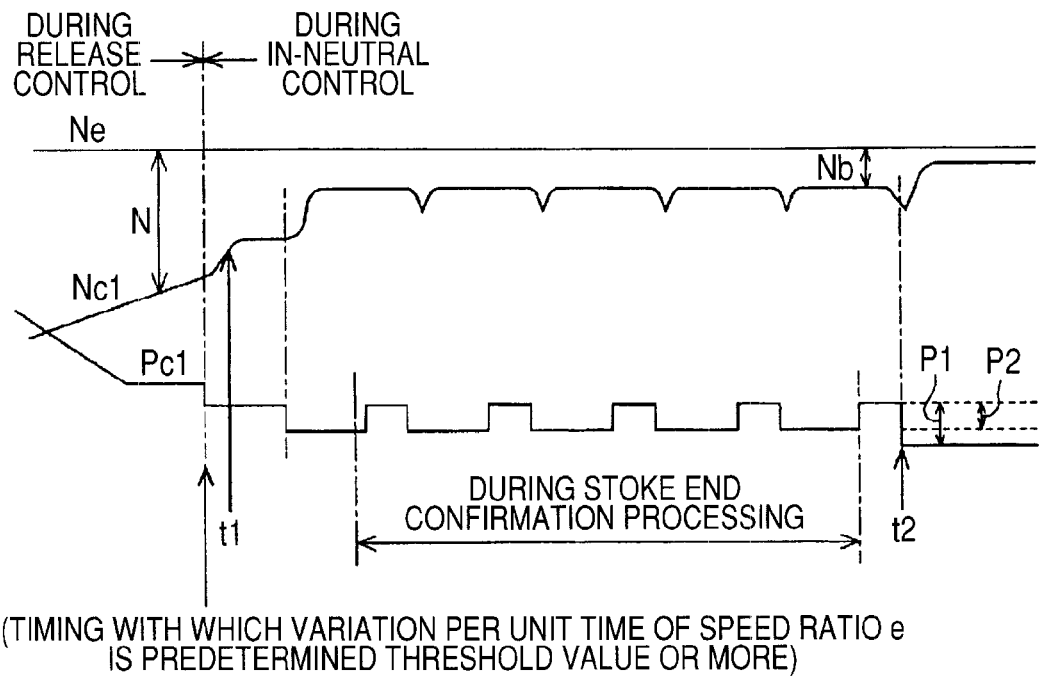
FIG. 8 is a timing chart showing the timing with which operating oil pressure changes during the in-neutral control.

When the operating oil pressure Pc1 is reduced by the first oil pressure D1, as shown in the timing chart of FIG. 8, the frictional force generated by the first clutch C1 becomes small significantly, and consequently, the input-shaft rotating speed Nc1 becomes high. That is, the differential rotation N becomes small. Thereafter, the processing of ECU 50 proceeds to the following Operation S30-1.

In Operation S30-1, ECU 50 makes the first timer T1 perform counting-up. Then, ECU 50 determines whether or not the first timer T1 that has performed counting-up in Operation S30-1 is a preset stability confirmation time KT1 (for example, "2 seconds") or more (Operation S30-2). The stability confirmation time KT1 is the time that is taken after reduction of the operating oil pressure Pc1 for the hydraulic servo C-1 is executed with second timing t2 shown in FIGS. 8 and 9 and before the actual change of the operating oil pressure Pc1 is settled down, and is preset by experiments, simulation, etc. In addition, when the first timer Ti becomes the stability confirmation time KT1 or more, the actual operating oil pressure Pc1 is brought into a stable state.

In a case where the determination result of Operation S30-2 is a negative determination (T1<KT1), ECU 50 repeatedly executes the processing of each of Operations S30-1 and S30-2 until the determination result of Operation S30-2 becomes a positive determination. In addition, in a case where the brake switch SW1 becomes "Off" while the processing of each of Operations S30-1 and S30-2 is repeatedly executed, ECU 50 resets the first timer T1 to "0 (zero)", and then forcibly ends the in-neutral control processing routine.

On the other hand, in a case where the determination result of Operation S30-2 is a positive determination (T1≧KT1), ECU 50 sets the differential rotation Na after an oil pressure change as an initial differential rotation (Operation S30-3). Specifically, in a case where Operation S28 is executed, ECU 50 sets the differential rotation Nb before an oil pressure change set in Operation S24 to the differential rotation Na after an oil pressure change. On the other hand, in a case where Operation S29 is executed, ECU 50 newly detects the input-shaft rotating speed Nc1 on the basis of an input signal from the input-shaft rotating speed sensor SE2 after the execution of Operation S29. Then, ECU 50 subtracts the newly detected input-shaft rotating speed Nc1 from the engine speed Ne detected in Operation S21, and sets the subtraction result to the differential rotation Na after an oil pressure change. This differential rotation Na after an oil pressure change is the differential rotation set after the execution of Operation S28 or Operation S29. In this regard, in this embodiment, Operation S30-3 functions as an initial differential rotation setting operation included in the fluid-pressure reducing operation.

Subsequently, ECU 50 determines whether or not the absolute value of a difference between the differential rotation Nb before an oil pressure change set in Operation S24 and the differential rotation Na after an oil pressure change set in Operation S30-3 is a preset second differential rotation threshold value KN2 ("50 rpm" in this embodiment) or less (Operation S31). The second differential rotation threshold value KN2 is a reference value for determining whether or not the operating oil pressure Pc1 for the hydraulic servo C-1 is in a stable state after the in-neutral control is started, and is preset by experiments, simulation, etc. In a case where the determination result of Operation S31 is a negative determination (absolute value of (Nb−Na)>KN2), ECU 50 determines that the operating oil pressure Pc1 is not stable, and the processing thereof proceeds to Operation S20 mentioned above.

On the other hand, in a case where the determination result of Operation S31 is a positive determination (absolute value of (Nb−Na)≦KN2), ECU 50 makes the second timer T2 perform counting-up (Operation S34). Then, it is determined whether or not the second timer T2 that has performed counting-up in Operation S34 is a setting time KT2 (for example, "30 seconds") or more that is preset as a longer time than the stability confirmation time KT1 (Operation S35). In a case where this determination result is a negative determination (T2<KT2), ECU 50 repeatedly executes the processing of each of Operations S34 and S35 until the determination result of Operation S35 becomes a positive determination. In addition, in a case where the brake switch SW1 becomes "Off" while the processing of each of Operations S34 and S35 is repeatedly executed, ECU 50 resets each of the timers T1 and T2 to "0 (zero)", and then forcibly ends the in-neutral control processing routine.

On the other hand, in a case where the determination result of Operation S35 is a positive determination or more (T2≧KT2), ECU 50 resets each of the timers T1 and T2 to "0 (zero)" (Operation S36). Subsequently, ECU 50 newly detects the input-shaft rotating speed Nc1 on the basis of an input signal from the input-shaft rotating speed sensor SE2. Then, ECU 50 subtracts the newly detected input-shaft rotating speed Nc1 from the engine speed Ne detected in Operation S21, and sets the subtraction result to the after-stability differential rotation Ns (Operation 37). In this regard, in this embodiment, Operation S37 corresponds to the after-stability differential rotation setting operation included in the fluid-pressure reducing operation.

Subsequently, ECU 50 determines whether or not the after-stability differential rotation Ns set in Operation S37 has exceeded the first differential rotation threshold value KN1 (Operation S38). In a case where this determination result is a negative determination (Ns≦KN1), the processing of ECU 50 proceeds to Operation S42 as will be described later. On the other hand, in a case where the determination result of Operation S38 is a positive determination (Ns>KN1), ECU 50 determines whether or not the absolute value of a difference (variation) between the after-stability differential rotation Ns set in Operation S37 and the differential rotation Na after an oil pressure change detected in Operation S30-3 has exceeded a third differential rotation threshold value (variation threshold value) KN3 that is preset as a smaller value than the first differential rotation threshold value KN1 (Operation S39). The third differential rotation threshold value KN3 is a minimum value ("20 rpm" in this embodiment) that allows the input-shaft rotating speed Nc1 to be high on the basis of the driving of the hydraulic control circuit 40, and is preset by experiments, simulation, etc.

In a case where the determination result of Operation S39 is a negative determination (the absolute value of (Ns−Na) ≦KN3), the processing of ECU 50 proceeds to Operation S42 as will be described later. On the other hand, in a case where the determination result of Operation S39 is a positive determination (the absolute value of (Ns−Na)>KN3), ECU 50 determines whether or not the oil temperature Tf detected in Operation S25 is higher than the oil temperature threshold value KTf (Operation S40). In a case where this determination result is a negative determination (Tf≦KTf), the processing of ECU 50 proceeds to Operation S42 as will be described later.

On the other hand, in a case where the determination result of Operation S40 is a positive determination (Tf>KTf), ECU 50 controls the driving of the hydraulic control circuit 40 so that the operating oil pressure Pc1 for the hydraulic servo C-1 may be reduced by the second oil pressure D2 (Operation S41). In this regard, in this embodiment, Operation S41 corresponds to a variation fluid-pressure reducing operation included in the fluid-pressure reducing operation. When the processing of Operation S41 is executed in this way, as shown by the third timing t3 of FIG. 9, the frictional force in the first clutch C1 is lowered, whereby the input-shaft rotating speed Nc1 becomes high by the same value as the third differential rotation threshold value.

Subsequently, ECU 50 determines whether or not the brake switch SW1 is "OFF" (Operation S42). In a case where this determination result is a negative determination (SW1="ON"), ECU 50 determines that the stopped state of the vehicle is continued, and the processing thereof proceeds to the aforementioned Operation S34. On the other hand, in a case where the determination result of Operation S42 is a positive determination (SW1 ="OFF"), ECU 50 ends the in-neutral control processing routine.

Accordingly, in this embodiment, the effects that are shown below can be obtained.

(1) In a case where the differential rotation N between the engine speed Ne and the input-shaft rotating speed Nc1 (that is, differential rotation Nb before an oil pressure change) has exceeded the first differential rotation threshold value KN1 during the in-neutral control, since the frictional force generated in the first clutch C1 is comparatively large, the calorific value generated in the first clutch C1 increases. Therefore, in such a case, the friction generated in the first clutch is reduced by further reducing the operating oil pressure Pc1 (operating oil pressure for the first clutch C1) for the hydraulic servo C-1. Accordingly, during the neutral control at the time of stop of a vehicle, the calorific value generated in the first clutch C1 can be reduced, and degradation in the durability of the first clutch C1 can be suppressed.

(2) Further, the load of the torque converter 12 can be reduced by further reducing the operating oil pressure Pc1. Therefore, it is possible to surely contribute to an improvement in the fuel efficiency of the engine 10 at the time of stop of a vehicle, and it is possible to a reduction in the vibration of the vehicle at the time of stop of the vehicle.

(3) Further, even if the operating oil pressure Pc1 for the hydraulic servo C-1 is reduced as described above, the half-engagement state of the first clutch C1 is maintained. Therefore, in a case where apply control is executed after that, the first clutch C1 can be rapidly brought into an engagement state as compared with a case where this first clutch C1 is in a completely released state.

(4) Generally, the differential rotation N between the engine speed Ne and the input-shaft rotating speed Nc1 may become large gradually even during the in-neutral control. Thus, in this embodiment, during the in-neutral control, the differential rotation N when the operating oil pressure Pc1 for the hydraulic servo C-1 become stable is set to the differential rotation Na after an oil pressure change. Thereafter, the differential rotation N is detected at every setting time KT2 (given period) from a point of time when it is determined that the operating oil pressure Pc1 for the hydraulic servo C-1 becomes stable, and the detected result is set to the after-stability differential rotation Ns. Also, in a case where the after-stability differential rotation Ns exceeds the first differential rotation threshold value KN1, and the absolute value of a subtraction result between the differential rotation Na after an oil pressure change and the after-stability differential rotation Ns exceeds the third differential rotation threshold value KN3, it is determined that the frictional force in the first clutch C1 is increasing, and the operating oil pressure Pc1 for the hydraulic servo C-1 is reduced. Accordingly, the neutral control at the time of stop of a vehicle can be performed, thereby contributing to a reduction in the calorific value generated in the first clutch C1.

(5) In a case where the differential rotation N (that is, the differential rotation Nb before an oil pressure change) has exceeded the first differential rotation threshold value KN1 before it is determined that the operating oil pressure Pd1 for the hydraulic servo C-1 has been brought into a stable state, the operating oil pressure Pc1 for the hydraulic servo C-1 is reduced by the first oil pressure D1 that is larger in the amount of pressure reduction than the second oil pressure D2. Therefore, in a case where the differential rotation Nb before an oil pressure change is comparatively high in a state where the in-neutral control is started, the calorific value generated in the first clutch C1 can be surely reduced by reducing the operating oil pressure Pc1 for the hydraulic servo C-1 in the first mode.

(6) On the other hand, in a case where the after-stability differential rotation Ns exceeds the first differential rotation threshold value KN1, and the absolute value of a subtraction result between the differential rotation Na after an oil pressure change and the after-stability differential rotation Ns exceeds the third differential rotation threshold value KN3 after it is determined that the operating oil pressure Pc1 for the hydraulic servo C-1 has been brought into a stable state, it is possible to sufficiently reduce the frictional force in the first clutch C1 if the operating oil pressure Pc1 for the hydraulic servo C-1 is slightly reduced. Therefore, in this case, pressure reduction is made by the second oil pressure D2 that is smaller in the amount of pressure reduction than the first oil pressure D1. Accordingly, even in such as case, the operating oil pressure Pc1 can be reduced by a required lowest limit, thereby reducing the frictional force that is becoming high by the first clutch C1, unlike a case where the operating oil pressure Pc1 is reduced by the first oil pressure D1.

(7) Generally, the relationship between the magnitude of the differential rotation N, and the operating oil pressure Pd1 for the hydraulic servo C-1 of when the oil temperature Tf of the operating oil is comparatively high is different from the relationship between the magnitude of the differential rotation N, and the operating oil pressure Pc1 for the hydraulic servo C-1 when the oil temperature Tf of the operating oil is comparatively low because the characteristics of the operating oil vary with the oil temperature Tf. Thus, in this embodiment, only in a case where the relationship between the magnitude of the differential rotation N and the operating oil pressure Pc1 for the hydraulic servo C-1 is almost the same (that is, in the case of Tf>KTf), the pressure-regulating control of the operating oil pressure Pc1 for the hydraulic servo C-1 during the in-neutral control is executed. Therefore, a desired effected can be surely obtained by executing the pressure-regulating control of operating oil pressure Pc1 for the hydraulic servo C-1.

(8) Further, in a case where the oil temperature Tf of the operating oil is comparatively low (for example, Tf="30°"), even if the frictional force generated in the first clutch C1 is large, the heat generated on the basis of the friction is radiated to the operating oil. Therefore, in a case where the oil temperature Tf of the operating oil is comparatively low, even if the operating oil pressure Pc1 is not reduced, it is possible to suppress that the heat generated in the first clutch C1 is accumulated in the first clutch C1.

(9) In this embodiment, in a case where the processing of Operation S29 is executed, the differential rotation N newly detected after the processing of Operation S29 is set to the differential rotation Na after an oil pressure change (initial differential rotation). Therefore, the execution timing of the subsequent variation fluid-pressure reducing operation (Operation S41) can be set to more exact timing because the differential rotation after the execution of the differential rotation fluid-pressure reducing operation (Operation S29) is adopted as a reference.

In addition, this embodiment may be modified to other following embodiments.

In an embodiment, the oil temperature threshold value KTf may be a different value (for example, "70°") other than "80°".

In an embodiment, in Operation S30-3, the differential rotation Nb before an oil pressure change set in Operation S24 may be set to the differential rotation Na after an oil pressure change (that is, initial differential rotation) even in a case where the processing of either Operation S28 or Operation S29 has been executed. If such a configuration is adopted, unlike a case where the differential rotation N detected after the execution of the processing of Operation S29 is set to the differential rotation Na after an oil pressure change, the execution of the subsequent Operation S41 can keep the operating oil pressure Pc1 from becoming lower than an oil pressure region where the first clutch C1 can be maintained in the state of half-engagement. That is, the first clutch C1 can be kept from being brought into a released state.

Here, when the first clutch C1 is brought into a released state, there is a possibility that the problem as shown below may occur. That is, in a case where the differential rotation N is made large to a certain target value, it is necessary to boosting the operating oil pressure Pd1 for the first clutch C1 in order to return the first clutch C1 in the released state to a half-engagement state. Also, in a case where the first clutch C1 is brought into a half-engagement state, there is a possibility that vibration at this time may be transmitted to a driver through a vehicle body. Further, since the pressure-regulating control of the operating oil pressure Pc1 for the first clutch C1 is executed after it is possible to confirm that the first clutch C1 has been brought into a half-engagement state, much time may be taken until the pressure-regulating control is completed as compared with a case where the half-engagement state of the first clutch C1 is maintained. In that regard, in this other embodiment, generation of the above problems can be suppressed.

In an embodiment, in Operation S41, the operating oil pressure Pc1 may be reduced by the first oil pressure D1. Further, in a case where the determination result of Operation S39 is a positive determination, in Operation S41, the amount of pressure reduction of the operating oil pressure Pc1 may be increased as the absolute value of a subtraction result between the after-stability differential rotation Ns and the differential rotation Na after an oil pressure change is larger.

In an embodiment, in a case where the determination result of Operation S26 is a positive determination, in Operation S29, the amount of pressure reduction of operating oil pressure Pc1 may be increased as the differential rotation Nb before an oil pressure change is larger.

In an embodiment, the processing after Operation S34 may not be executed. That is, in a case where the determination result of Operation S31 is a positive determination, the operating oil pressure Pc1 may be maintained while the brake switch SW1 is "ON". Even in such a configuration, in a case where the differential rotation Nb before an oil pressure change has exceeded the first differential rotation threshold value KN1 after the start of the in-neutral control, the operating oil pressure Pc1 is reduced. Therefore, the frictional force generated in the first clutch C1 can be reduced well by the execution of neutral control.

In an embodiment, the processing of each of Operations S26 to S29 may not be executed. Even in such a configuration, in a case where the after-stability differential rotation Ns has exceeded the first differential rotation threshold value KN1 during the in-neutral control, and the absolute value of a subtraction result between the differential rotation Na after an oil pressure change and the after-stability differential rotation Ns has exceeded the third differential rotation threshold value KN3, the operating oil pressure Pc1 is reduced. Therefore, the frictional force generated in the first clutch C1 can be reduced well by the execution of neutral control.

In an embodiment, the differential rotation Nb before an oil pressure change may be set with arbitrary timing as long as the operating oil pressure Pc1 is reduced after completion of the stroke end confirmation processing from a point of time when in-neutral control is started.

In an embodiment, the engagement and disengagement of the first clutch C1 may be executed by controlling the regulation of the pressure of other fluids (for example, gas) other than the operating oil.

In an embodiment, the automatic transmission 11 may be embodied as other automatic transmissions (for example, an automatic transmission of four forward stages and one reverse stage). Further, the automatic transmission 11 may be embodied as an endless transmission in which a transmission mechanism is provided with a belt.

In an embodiment, the automatic transmission 11 may be mounted on an electric vehicle or hybrid vehicle. In this case, a motor used as a driving source of the electric vehicle or hybrid vehicle functions as a prime mover.

What is claimed is:

1. A control device of an automatic transmission comprising a rotation transmission mechanism for transmitting the rotation of a prime mover mounted on a vehicle to a transmission mechanism, and an input clutch for controlling to connect and disconnect the rotation transmitted from the rotation transmission mechanism,
    the control device including a control means that causes the fluid pressure for the input clutch to be reduced, and executes the neutral control of bringing the input clutch in an engagement state into a half-engagement state, in a case where the vehicle is in a stopped state, and the control means executing the in-neutral control of maintaining the half-engagement state of the input clutch during the neutral control,
    wherein the control device further includes a differential rotation detecting means that detects differential rotation between the input-side engine speed and output-side rotating speed of the rotation transmission mechanism, and
    wherein the control means causes the fluid pressure for the input clutch to be reduced in a case where the differential rotation detected by the differential rotation detecting means has exceeded a preset differential rotation threshold value in a state where the control for holding the fluid pressure for the input clutch at a fixed pressure is started in order to maintain the half-engagement state of the input clutch during the in-neutral control.
    wherein the differential rotation detecting means detects as initial differential rotation the differential rotation after the control that holds the fluid pressure for the input clutch at a fixed pressure is started during the in-neutral control, and detects as after-stability differential rotation the differential rotation for every present given period from a point of time where it is determined that the fluid pressure for the input clutch has actually been brought into a stable state on the basis of the execution of the control that holds the fluid pressure for the input clutch at a fixed pressure, and
    wherein the control means causes the fluid pressure to be reduced in a case where the after-stability differential rotation detected by the differential rotation detecting means has exceeded the differential rotation threshold value, and a subtraction result between the initial differential rotation and the after-stability differential rotation has exceeded a variation threshold value that is preset as a value smaller than the differential rotation threshold value, after it is determined that the fluid pressure for the input clutch has actually been brought into a stable state.

2. The control device of an automatic transmission according to claim 1,
    wherein the control means causes the fluid pressure for the input clutch to be reduced in a case where the differential rotation detected by the differential rotation detecting means has exceeded a preset differential rotation threshold value before the control means determines that the fluid pressure for the input clutch has actually been brought into a stable state, in a state where the control for holding the fluid pressure for the input clutch at a fixed pressure is started during the in-neutral control.

3. The control device of an automatic transmission according to claim 2, further comprising a temperature detecting means for detecting the temperature of fluid for generating the fluid pressure for the input clutch,
    wherein the control means causes the fluid pressure for the input clutch to be reduced in a case where the control for holding the fluid pressure for the input clutch at a fixed pressure is being executed and the temperature of the fluid detected by the temperature detecting means is higher than a preset temperature threshold value, during the in-neutral control, and in a case where the differential rotation detected by the differential rotation detecting means has exceeded the differential rotation threshold value.

4. The control device of an automatic transmission according to claim 1, further comprising a temperature detecting means for detecting the temperature of fluid for generating the fluid pressure for the input clutch,
    wherein the control means causes the fluid pressure for the input clutch to be reduced in a case where the control for holding the fluid pressure for the input clutch at a fixed pressure is being executed and the temperature of the fluid detected by the temperature detecting means is higher than a preset temperature threshold value, during the in-neutral control, and in a case where the differential rotation detected by the differential rotation detecting means has exceeded the differential rotation threshold value.

5. The control device of an automatic transmission according to claim 1,
    wherein the control means causes the fluid pressure for the input clutch to be reduced in a first mode in a case where the differential rotation detected by the differential rotation detecting means has exceeded the differential rotation threshold value before it is determined that the fluid pressure for the input clutch has actually been brought into a stable state, and
    the control means causes the fluid pressure for the input clutch to be reduced in a second mode in a case where the after-stability differential rotation detected by the differential rotation detecting means has exceeded the differential rotation threshold value, and a subtraction result between the initial differential rotation and the after-stability differential rotation has exceeded a variation threshold value that is preset as a value smaller than the differential rotation threshold value, after it is determined that the fluid pressure for the input clutch has actually been brought into a stable state.

6. The control device of an automatic transmission according to claim 5,
wherein the first mode is set so that the amount of pressure reduction of the fluid pressure may increase as compared with a case where the fluid pressure for the input clutch is reduced on the basis of the second mode.

7. The control device of an automatic transmission according to claim 5, further comprising a temperature detecting means for detecting the temperature of fluid for generating the fluid pressure for the input clutch,
wherein the control means causes the fluid pressure for the input clutch to be reduced in a case where the control for holding the fluid pressure for the input clutch at a fixed pressure is being executed and the temperature of the fluid detected by the temperature detecting means is higher than a preset temperature threshold value, during the in-neutral control, and in a case where the differential rotation detected by the differential rotation detecting means has exceeded the differential rotation threshold value.

8. The control device of an automatic transmission according to claim 1, further comprising a temperature detecting means for detecting the temperature of fluid for generating the fluid pressure for the input clutch,
wherein the control means causes the fluid pressure for the input clutch to be reduced in a case where the control for holding the fluid pressure for the input clutch at a fixed pressure is being executed and the temperature of the fluid detected by the temperature detecting means is higher than a preset temperature threshold value, during the in-neutral control, and in a case where the differential rotation detected by the differential rotation detecting means has exceeded the differential rotation threshold value.

9. A control method of an automatic transmission including a rotation transmission mechanism for transmitting the rotation of a prime mover mounted on a vehicle to a transmission mechanism, and an input clutch for controlling to connect and disconnect the rotation transmitted from the rotation transmission mechanism, and
the method executing the neutral control of bringing the input clutch in an engagement state into a half-engagement state, when the vehicle is in a stopped state,
the method comprising:
a release operation of executing the release control that causes the fluid pressure for the input clutch to be reduced in order to bring the input clutch in an engagement state into a half-engagement state when the vehicle is in a stopped state;
an in-neutral operation of confirming whether or not the input clutch is in a half-engagement state after the execution of the release operation, and of executing the in-neutral control of causing the fluid pressure for the input clutch to be held at a fixed pressure in a case where it is confirmed that the input clutch is in a half-engagement state; and
a fluid-pressure reducing operation of detecting differential rotation between the input-side engine speed and the output-side rotating speed of the rotation transmission mechanism during execution of the control that holds the fluid pressure for the input clutch at a fixed pressure during the in-neutral control, and of causing the fluid pressure for the input clutch to be reduced in a case where the detected result has exceeded a preset differential rotation threshold value;

wherein the fluid-pressure reducing operation includes:
an initial differential rotation setting operation of setting to initial differential rotation the differential rotation detected in a state where the control that holds the fluid pressure for the input clutch at a fixed pressure is started during the in-neutral control;
an after-stability differential rotation setting operation of setting to after-stability differential rotation the differential rotation detected for every preset given period from a point of time when it is determined that the fluid pressure for the input clutch has actually been brought into a stable state on the basis of the execution of the control that holds the fluid pressure for the input clutch at a fixed pressure; and
a variation fluid-pressure reducing operation of causing the fluid pressure for the input clutch to be reduced in a case where the after-stability differential rotation set in the after-stability differential rotation setting operation has exceeded the differential rotation threshold value, and a subtraction result between the initial differential rotation and the after-stability differential rotation has exceeded a variation threshold value that is preset as a value smaller than the differential rotation threshold value.

10. The control method of an automatic transmission according to claim 9,
wherein the fluid-pressure reducing operation includes a differential rotation fluid-pressure reducing operation of causing the fluid pressure for the input clutch to be reduced in a case where differential rotation before it is determined that the fluid pressure for the input clutch has actually been brought into a stable state has exceeded the differential rotation threshold value, in a state where the control for holding the fluid pressure for the input clutch at a fixed pressure is started during the in-neutral control.

11. The control method of an automatic transmission according to claim 10,
wherein
in the initial differential rotation setting operation, in a case where differential rotation before it is determined that the fluid pressure for the input clutch has actually been brought into a stable state is the differential rotation threshold value or less after the control that holds the fluid pressure for the input clutch at a fixed pressure is started during the in-neutral control, setting the differential rotation to initial differential rotation, and, even in a case where the differential rotation before it is determined that the fluid pressure for the input clutch has actually been brought into a stable state has exceeded the differential rotation threshold value, setting the differential rotation to initial differential rotation.

12. The control method of an automatic transmission according to claim 9, wherein
in the initial differential rotation setting operation, in a case where differential rotation before it is determined that the fluid pressure for the input clutch has actually been brought into a stable state is the differential rotation threshold value or less after the control that holds the fluid pressure for the input clutch at a fixed pressure is started during the in-neutral control, setting the differential rotation to initial differential rotation, and setting differential rotation detected after the execution of the differential rotation fluid-pressure reducing operation to initial differential rotation, in a case where the differential rotation before it is determined that the fluid pressure for the input clutch has actually been brought into a stable state has exceeded the differential rotation threshold value.

* * * * *